Patented Apr. 5, 1932

1,852,687

UNITED STATES PATENT OFFICE

HAROLD VON BRAMER, OF KINGSPORT, TENNESSEE, ASSIGNOR TO EASTMAN KODAK COMPANY, OF ROCHESTER, NEW YORK, A CORPORATION OF NEW YORK

DOUBLE SALTS AND PROCESS OF PRODUCING THEM

No Drawing.    Application filed April 7, 1931. Serial No. 528,455.

This invention relates to anhydrous double salts of manganous sulfate and ammonium sulfate, and processes for preparing them.

As manganese salts are valuable as a fertilizer or fertilizer component it is desirable that they be anhydrous in order to avoid shipping and handling water in the form of water of crystallization, as obviously the water contributes nothing to the utility of the product. Heretofore it has only been known to obtain an anhydrous manganese salt by heating the known manganese sulfate having one or more molecules of water as water of crystallization to temperatures as high as 400–500° C. until the anhydrous salt is obtained. Some have even tried obtaining anhydrous double salts of manganese by direct crystallization but without commercial success.

I have found that anhydrous double salts of manganese sulfate and ammonium sulfate can be prepared by crystallizing the double salt from a solution of the two salts in which the manganous sulfate is present in the ratio of greater than two moles and not more than seven moles for each mole of ammonium sulfate present. By suitable provision, hereinafter apparent, the process may, of course, be operated continuously upon a commercial scale. While nitrogen may be provided for fertilizers in less costly form, it is to be noted that one of the features of my invention is to provide an anhydrous manganese salt in a commercially economical form without useless inert constituents. The ammonium sulfate molecule appearing in my double salt actually adds to the value of the salt as a fertilizer.

It is, therefore, an object of my invention to produce anhydrous manganous ammonium sulfate and to provide a process for continuously and economically carrying out such process upon a commercial scale. Other objects will be apparent upon a further perusal of this specification.

As an example of my process and assuming it is desired to operate it upon a plant scale, there may be first prepared an aqueous solution containing manganous sulfate and ammonium sulfate in the molecular ratio of about five to one, the total salts in the solution ranging conveniently between 20% and 25%. This solution is brought to boiling at atmospheric pressure, the vapors being carried away as is usual in evaporating processes and the solution being constantly agitated in order to keep the crystals in suspension. This solution may be referred to as the mother liquor which it obviously is, inasmuch as crystallization commences in a relatively short time. The first crystals which separate out, however, contain some water of crystallization and only 5–6% by weight of ammonium sulphate; obviously these are not anhydrous salts. The anhydrous crystals to be most desired contain approximately 11.1% by weight of ammonium sulfate. The composition of this first crop of crystals indicates that the ratio of ammonium sulfate to manganous sulfate in the mother liquor has increased or built up.

Proceeding, therefore, with the process, I slowly add to the boiling mother liquor an aqueous solution in which is dissolved manganous sulfate and ammonium sulfate, the former having the ratio of preferably five to seven moles to one mole of the latter and the total salt content of the solution preferably ranging between 20% and 25%. In other words, the solution which I add to the mother liquor is substantially the same, or may even be the same, as the solution which was used to provide the above mother liquor. It will be noted, however, that the ratio of ammonium sulfate to manganous sulfate is greater in the mother liquor than in the solution being added to the mother liquor.

As the process proceeds (with continued boiling and stirring of the mother liquor) the first crop of crystals build up and become transformed to anhydrous ones in which the molecular ratio of ammonium sulfate is such that it will be apparent that I have obtained an anhydrous double salt having the formula

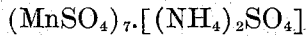

i. e., one in which the molecular ratio of manganous sulfate to ammonium sulfate is seven to one. Inasmuch as the ammonium sulfate in the mother liquor is in excess of that necessary to form the foregoing salt, some normal ammonium sulfate crystals may actually come down in anhydrous form with the double salt crystals. For purposes, however, of producing a fertilizer or fertilizer component the presence in the product of anhydrous ammonium sulfate is not objectionable.

If one desires to obtain in greater purity, the double salt referred to he needs merely to more carefully control the ratio of ammonium sulfate to manganous sulfate in the solution being added to the mother liquor to a molecular ratio of one to seven. However, the molecular ratio of manganous sulfate to ammonium sulfate in the mother liquor must not be permitted to exceed seven to one or the double salt will become crystallized with water of crystallization which is the very thing desired to be avoided. If the ammonium sulfate present in the solution being added to the mother liquor is increased to a ratio of, for instance, one mole of ammonium sulfate for each three or four moles of manganous sulfate, there will still result an anhydrous double salt in which the manganous sulfate and the ammonium sulfate will have the same molecular ratio as in the solution added.

As soon as the composition of the crystals becomes constant according to the preferred process described above, these crystals may be continuously removed at the same ratio as solid matter is added to the mother liquor. Various means for doing this will suggest themselves to those skilled in the art, such as a long tank with a slightly inclined bottom, the solution being added at the shallow end and the crystals being withdrawn at the deep end of the tank. A paddle stirrer (motor driven) may be employed for agitation. The heating of the tank may be obtained, for instance, by steam under pressure in pipes underneath or in the bottom of the tank. Even more desirably, one may employ rapid circulation tube evaporators in which the mother liquor is maintained, to which the fresh solution is added and from which the crystals are withdrawn. Upon removal of the crystals from the mother liquor they are immediately drained, such as by centrifuging, and dried at approximately 100° C. They then make a very desirable anhydrous fertilizer or fertilizer constituent.

While the solutions above referred to as being used may be made up from commercial salts obtainable upon the open market the process is of great utility in producing this double salt as a by-product in the production of hydroquinone as described in Von Bramer and Zabriskie application Serial No. 363,808, filed May 17, 1929, wherein a solution of ammonium sulfate and manganous sulfate is produced in the oxidation of aniline to quinone by the use of manganese dioxide and sulfuric acid. This solution need merely to be corrected to the proportions above set forth whereupon it may be added to the mother liquor of my present process for the production of the anhydrous double salts of manganous sulfate and ammonium sulfate referred to.

It will be understood that I have attempted to disclose herein only the necessary working principles of my invention and that those skilled in the art may conceive various detailed modifications of these principles which will be equally as effective yet come within the spirit and scope of my invention. For instance, the evaporation of the mother liquor may be conducted by boiling under reduced pressure so that while still boiling, the temperature of the mother liquor may be only 90° C. or 75° C. or even as low as 50° C., depending upon the degree to which the pressure of the evaporating vessel is reduced. I am, therefore, to be limited only by the claims appended hereto as read in the light of the foregoing specification.

What I claim as my invention and desire to be secured by Letters Patent of the United States is:

1. An anhydrous double salt having more than two and not more than seven molecules of manganous sulfate for each molecule of ammonium sulfate present in the salt.

2. An anhydrous double salt having seven molecules of manganous sulfate for each molecule of ammonium sulfate present in the salt.

3. The process of producing an anhydrous double salt of manganous sulfate and ammonium sulfate which comprises crystallizing the salt from boiling aqueous solution containing one mole of ammonium sulfate to more than two and not more than seven moles of manganous sulfate at a temperature greater than 50° C. and a pressure not greater than atmospheric.

4. The process of producing an anhydrous double salt of manganous sulfate and ammonium sulfate which comprises crystallizing the salt from boiling aqueous solution containing one mole of ammonium sulfate to more than two and not more than seven moles of manganous sulfate at the atmospheric boiling point of the solution.

5. The process of producing an anhydrous double salt of manganous sulfate and ammonium sulfate which comprises adding an aqueous solution (1) of manganous sulfate and ammonium sulfate in which the ammonium sulfate is not less than one mole thereof to seven moles of manganous sulfate, to (2) a boiling aqueous mother liquor containing manganous sulfate and ammonium sulfate, the ammonium sulfate being present in the mother liquor in a ratio to the manganous sulfate which is greater than the ratio in which it is present in the first solution.

6. The process of producing an anhydrous double salt of manganous sulfate and ammonium sulfate which comprises continuously adding an aqueous solution (1) of manganous sulfate and ammonium sulfate, in which the ammonium sulfate is not less than one mole thereof to seven moles of manganous sulfate, to (2) a boiling aqueous mother liquor containing manganous sulfate and ammonium sulfate, the ammonium sulfate being present in the mother liquor in a ratio to the manganous sulfate which is greater than the ratio in which it is present in the first solution, and continuously withdrawing from the mother liquor the crystals which are formed.

Signed at Rochester, New York this 1st day of April, 1931.

HAROLD VON BRAMER.